United States Patent [19]
Joyslen

[11] 3,711,114
[45] Jan. 16, 1973

[54] POWER STABILIZER AND METHOD
[75] Inventor: Jack F. Joyslen, San Ramon, Calif.
[73] Assignee: Gerhard W. Stiefrater, Chico, Calif.
[22] Filed: Sept. 30, 1971
[21] Appl. No.: 185,098

Related U.S. Application Data
[62] Division of Ser. No. 36,136, May 11, 1970, Pat. No. 3,625,301.

[52] U.S. Cl..............................................280/124 F
[51] Int. Cl...............................................B60g 21/10
[58] Field of Search......................280/124 F, DIG. 1

[56] References Cited
UNITED STATES PATENTS

| | | | |
|---|---|---|---|
| 2,918,305 | 12/1959 | Faiver | 280/124 F |
| 2,954,237 | 9/1960 | Sampietro | 280/124 F |

Primary Examiner—Philip Goodman
Attorney—Mark Mohler et al.

[57] ABSTRACT

A device to be connected in the hydraulic system in a conventional vehicle that includes a body-supporting chassis sprung on wheel-mounted running gear, which device includes relatively movable elements connecting the chassis and running gear adjacent to each of the ground wheels automatically hydraulically actuatable for restricting unsafe movements of the chassis and body relative to the running gear during either straight away movement of the vehicle over the ground, or around curves during normal or abnormal operation of the vehicle and application of the brakes, and which device also performs the function of shock absorbers.

5 Claims, 6 Drawing Figures

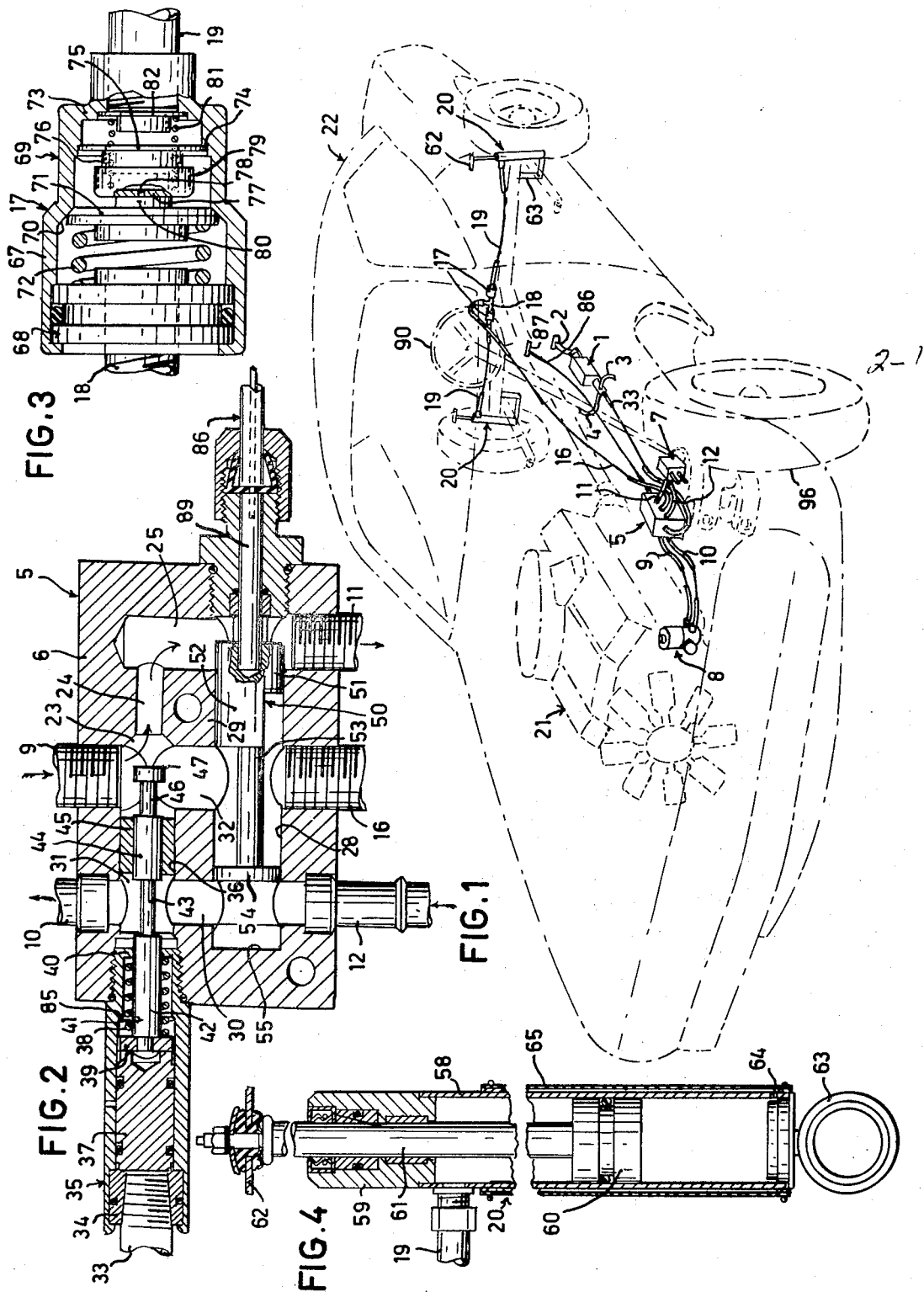

POWER STABILIZER AND METHOD

SUMMARY

This application is a division of Ser. No. 36,136 filed May 11, 1970 now U.S. Pat. No. 3,625,301.

Heretofore approaches toward stabilizing the sprung loads on motor vehicles have in some instances involved the substitution of an hydraulic-pneumatic system for the conventional spring suspension system, or the installation of hydromechanical means for locking the front shock absorbers or for locking all four shock absorbers upon application of brakes to prevent any vertical movement of the sprung load relative to the wheels. Other systems require modifying the brakes or axle housings and utilizing the braking torque and a connection between the backing plates and chassis for transmitting a downward force to the rear end of the chassis upon application of the brakes.

Emergency braking to effect a "panic stop" has heretofore resulted in many fatal and near-fatal accidents through the driver's loss of control of the vehicle. Usually this loss of control has been due to shifting of the normal center of gravity, and sprung weight, toward the front wheels, and an upward movement of the rear end. In an emergency stop this movement may result in the rear wheels leaving the ground, and in any event, in an attempt to steer out of a skid the vehicle may leave the road and overturn, or collide with an oncoming vehicle in an adjoining lane, causing injuries and fatalities to others as well as to the occupants of the vehicle that is out of control.

In addition to the foregoing, heretofore there has been a "nose dive" effect upon application of the brakes. In a collision, the attitude of the front end of an automobile is very important. If there is no nose dive there is no excess load transmitted to the front tires and the forward pitching effect on the occupants of the automobile.

The most common type of collision occurs from "-tailgating", and here the so-called "panic stop" occurs due to the sudden, strong application of the brakes in which, heretofore, the "nose dive" and elevation of the rear end are most pronounced. Where successive collisions occur, due to the sudden stop of one automobile, the depressed forward ends of successive automobiles have passed under the elevated rear ends of the leading automobiles injuring and many times rupturing the fuel tank on the leading automobile.

One of the objects of the present invention is the provision of automatically actuated means for not only preventing the downward movement of the forward end of an automobile upon application of the brakes, but which will positively lower the rear end preventing even the lower forward end of a following automobile to pass under the rear end of the leading vehicle, and particularly in those instances where the brakes on both vehicles are strongly and suddenly applied.

Another of the objects of the invention is the provision of a vehicle stabilizing means adapted to be installed on any motor vehicle having a sprung load or chassis and an hydraulic brake system, and which stabilizing means is automatically operative, under the influence of hydraulic pressure in said system, for preventing the forward shifting of the center of gravity of the vehicle upon application of the brakes, and to actually releasably lock the rear end of the vehicle rigid on the rear wheel supporting system in a severe braking operation, thereby preventing loss of control of the vehicle and effecting an orderly stop within the capacity of the brakes.

Actuation of the brakes of a motor vehicle during cornering, or going around a curve, frequently results in overturning of the vehicle, and where a curve is not banked and a turning effort on the steering wheel is necessary when the vehicle is moving fairly fast, the side sway of the sprung weight on the wheels relative to the running gear may be sufficient to effect side skidding and even overturning of the vehicle, or loss of control.

One of the objects of the present invention is the provision of means which, when installed on a motor vehicle, will automatically prevent loss of control of the vehicle while going around a banked, inadequately banked, or unbanked curve at a rate of speed at which loss of control would occur or would be likely to occur, and an additional object of the invention is the provision of means installable on a motor vehicle having power steering that may be quickly made operative or inoperative, as desired, and when operative will automatically prevent side sway of the vehicle in going around a corner at a rate of speed in which any noticeable degree of such side sway would otherwise be noticed and which installation will be automatically operative at all times for preventing detrimental shifting of the center of gravity of the sprung weight when the brakes are applied, whether the vehicle is moving along a straight road or around a curve.

Another object of the invention is the provision of a method for stabilizing a motor vehicle against loss of control in going around curves and corners and in making emergency application of brakes.

Other objects and advantages will appear in the description and drawings.

DESCRIPTION OF DRAWINGS

FIG. 1 is a diagrammatic view of the present invention in a motor vehicle, the outline of the vehicle and certain standard parts being indicated in dot-dash lines, and the present invention including other conventional mechanisms cooperatively associated therewith being indicated in full lines with parts of hydraulic pipe lines being indicated in single lines.

FIG. 2 is a simplified cross-sectional view through the control valve assembly of the present invention, the unit being diagrammatically indicated in FIG. 1.

FIG. 3 is an enlarged, cross-sectional view through one of a pair of check valves indicated in FIG. 1.

FIG. 4 is an enlarged, cross-sectional view taken longitudinally through one of a pair of hydraulic cylinders indicated in FIG. 1.

DETAILED DESCRIPTION

Figure 5:
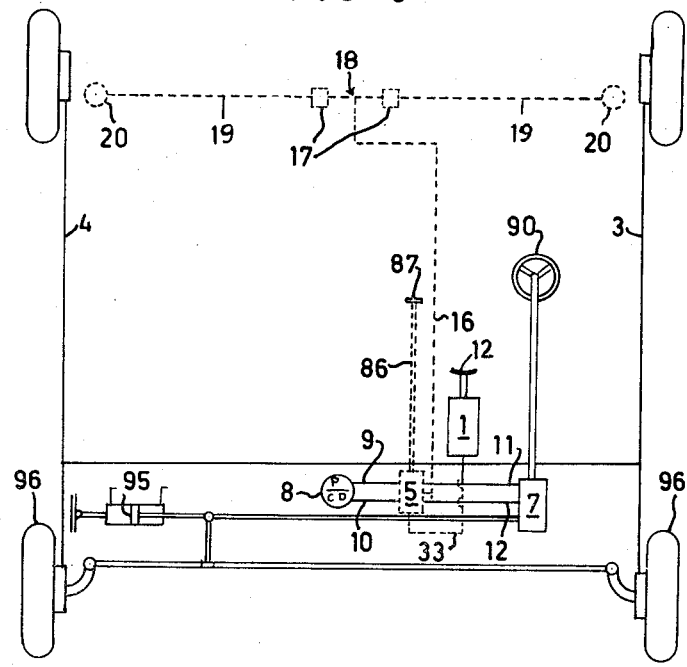
FIG. 5 is a reduced size diagrammatic view of an entire power steering and braking system, with the mechanisms and hydraulic lines of the present invention indicated in dotted lines to readily indicate their relationship to existing conventional mechanisms, the latter being indicated in unbroken lines and the conventional hydraulic tubing for hydraulic fluid being shown in single lines.

Referring to the system diagrammatically shown in FIG. 1, the conventional master cylinder is generally designated 1, and is actuated by the brake pedal 2 for hydraulically transmitting force through brake lines 3, 4 to the wheel cylinders on the front and rear wheels for applying the brakes.

A control valve assembly, generally designated 5, comprises a body 6 (FIG. 2) that is secured rigid on the chassis, or engine, in any suitable location. This is new.

A conventional power steering unit, generally designated 7 is also secured on the chassis and hydraulic fluid from a constant volume pump 8 is circulated through the power steering unit. The master cylinder 1, power steering unit 7 and constant volume pump 8 are standard in automobiles, and may remain on the vehicle in the present instance in their normal positions. The present invention in no way effects their performance of their intended functions or their manner of operation.

Hydraulic fluid lines 9, 10 connected with pump 8 at one of their ends and with the control valve assembly 5 at their opposite ends respectively provide outgoing and return lines for the hydraulic fluid, and hydraulic lines 11, 12 connected at one of their ends with the control valve assembly 5 and at their opposite ends with the power steering unit 7 respectively provide conduits for flow of the hydraulic fluid to the power steering unit, and for the return of said fluid to the control valve assembly 5. Passageways within the body 6 of the control valve assembly communicate between the lines 9, 11 and 12, 10 at all times to provide adequate fluid to the power steering unit so function of the latter in assisting the steering operation will in no manner be impaired, as will later appear.

An hydraulic fluid line 16 connects at one end with the control valve assembly 5 and at its opposite end with a pair of check valves 17 (FIGS. 1, 3) through a T-fitting 18 (FIG. 1), and hydraulic lines 19 connect the respective check valves with the upper ends of hydraulic cylinders 20 (FIGS. 1, 3) that may be supported on the conventional shock absorber mounts, or any other suitable means, as will later be explained more in detail.

Referring to FIG. 1, the vehicle motor and vehicle are respectively generally designated 21 and 22, and are indicated in dot-dash lines. Assuming the motor 21 is running, the constant volume delivery pump 8 will be driven by said motor and the hydraulic fluid will circulate freely, passing from pump 8 through line 9 into a chamber 23 (FIG. 2) in body 6 and from chamber 23 through a passageway 24 into one end of a passageway 25. This passageway 25 communicated directly with the power steering unit through line 11. This line of communication from pump 8, through body 6 of the control valve assembly 5 to the power steering unit 7 is always sufficiently open to provide adequate fluid to the power steering unit for unimpaired functioning of the latter in its normal manner. In a conventional power steering arrangement, the lines 9, 10 would extend directly to the power steering unit, with lines 11, 12 being parts thereof.

The hydraulic line 12 from the power steering unit 7 to the control valve assembly 5 opens into an inlet in one side of body 6 that communicates with one end of a passageway 28, the latter extending at a right angle to said inlet, and to passageway 25 and parallel with passageway 24. The passageway 28 is spaced from passageway 24 by a partition 29 and is formed with a passageway 32 intermediate passageway 25 and another passageway 36.

The passageway 30 extends transversely across partition 29 in axial alignment with the inlet for hydraulic line 12, and this passageway 30 communicates at all times with a chamber 31 that, in turn, communicates with the hydraulic line 10. This line 10 and line 12, passageway 30 and chamber 31 provide the return line for fluid from the power steering unit to pump 8.

By the foregoing structure it is apparent that the installation of the control valve assembly 5 in the power steering system does not impair the functioning of the power steering unit in its intended manner.

As already mentioned, the master brake cylinder 1 is connected by lines 3, 4 with the normal hydraulic wheel cylinders (FIG. 5) that actuate the front and rear brakes when the brake pedal 2 is pressed. This structure and the manner of operation are so well known in the art as to not require further illustration or description.

An hydraulic line 33 (FIGS. 1, 2) connects at one end with the master cylinder 1 and its opposite end is secured within a central opening in a plug 34 (FIG. 3) which plug is secured, leak-proof, within the outer end of a tubular member 35. The inner end of member 35 is threadedly secured within an opening in one side of the body 6 of the control valve assembly, and said inner end opens into chamber 31 in coaxial alignment with a bore 36 in body 6 that, in turn, extends between and opens at opposite ends into chambers 31, 23. This bore 36 is of larger diameter than the passageway 24, and is in coaxial alignment with the latter.

A piston 37 is reciprocable within the tubular extension 35 longitudinally of the latter, and is yieldably urged against the plug 34 by a helical spring 38. Spring 38 reacts between a disc 39 and a radially inwardly projecting annular flange 40 formed on the inner end of said tubular extension 35, to yieldably hold disc 39 against the inner end of piston 37 and thus to yieldably hold piston 37 against plug 34.

The inner end of a rod 41 is slidably supported on the radially inwardly facing sides of the annular flange 40 on inner end of the tubular extension 35 and spring 38 surrounds the portion 42 of rod 41 that extends between flange 40 and the disc 39. The disc 39 is secured on or integral with rod 41.

A reduced diameter continuation 43 of rod 41 extends across chamber 31 to an enlarged diameter intermediate section 44 that, in turn, is slidably supported in a bushing 45 secured in bore 36. This section 44 and the bushing 45 closes communication between chambers 23, 31 through bore 36.

A reduced diameter axial extension 46 on rod 41 projects from section 44 into chamber 23 and said extension 46 has an enlarged head 47 on its terminal end positioned approximately centrally within chamber 23 and spaced from the passageway 24, which passageway 24 is coaxial with rod 41 and the enlarged head 47 on said rod.

When piston 37 is retracted under the influence of spring 38 to the maximum degree, said piston and the head 47 on rod 41 will be in the position shown in FIG. 2, in which it is centrally in chamber 32 and between hydraulic line 9 and passageway 32 that communicates between chamber 23 and passageway 28, and the brake pedal 2 will be in its inoperative position for applying the brakes. A spring within the master cylinder 1 normally retracts the brake pedal after each application of the brakes.

A valve member generally designated 50 is supported for reciprocation within the portion of passageway 28 that extends between the outlet from body 6 to the line 11, leading to the power steering unit, and the inlet into body 6 from the return line 12 from the power steering unit. Hydraulic line 16 that leads to check valves 17 opens into passageway 28 at a point intermediate the points where lines 11, 12 communicate with passageway 28, and opposite to passageway 32.

A portion 51 of valve member 50 blocks the passage of fluid from passageway 25 into passageway 28 at all times. Rigid with portion 50 is a portion 52 that is adapted to block passage of fluid from passageway 32 into passageway 28 and to line 16 when the valve member 50 is moved in passageway 28 in a direction away from passageway 25, but the side of portion 52 opposite to passageway 32 is cut away when passageway 32 is blocked so as to permit circulation of fluid from pump 8 through passageways 24, 25, line 11 to the power steering unit 7, and back to pump 8 through line 12, passageway 30, chamber 31 and line 10 without passing through passageway 32 while the passage of fluid from line 9 to line 16 is cut off.

A reduced diameter extension 53 on valve member 50 projects across the area in passageway 28 that is between passageway 32 and the opening of line 16 into passageway 28 when the valve member 50 and its portion 52 are in the full line position shown in FIG. 2 but does not obstruct the passage of fluid therepast and a head 54 is on the terminal end of extension 53 in a position blocking passage of fluid from passageway 30 into passageway 28. When valve member 50 is moved so that portion 52 blocks the flow of fluid from passageway 32, directly into passageway 28, the head 54 will be moved out of passageway 28 and across passageway 30 into a recess 55 that is opposite to the end of said passageway 28 so that fluid in line 16 will not be blocked but will be in communication with the line of communication through body 6 from line 12 to line 10. The line of communication between the cylinders 20 through line 16 is always open to the fluid in circulation by the pump, irrespective of the position of the valve member 50.

Cylinders 20 are identical, hence a description of the cylinder shown in FIG. 4 will suffice for both. Each cylinder comprises a barrel 58 having a head 59 at its upper end and a piston 60 reciprocable within barrel 58 having a piston rod 61 reciprocably extending through head 59. The terminal upper end portion of rod 61 may be secured by rubber grommets to the frame or a mount 62 rigid on the frame adjacent to each rear wheel, and the lower end of the cylinder or barrel 58 may be by a conventional mounting bracket and insulator assembly 63 to the rear axle housing. These mounts and brackets may be the same as employed for most conventional shock absorbers.

Hydraulic fluid lines 19 communicate with the interior of the cylinders 20 adjacent to their upper ends above pistons 60, and an aperture 64 in the lower end of each cylinder permits escape and replacement of air upon reciprocation of the piston. Each piston is preferably adjacent the lower closed end of each cylinder, but spaced at least a sufficient distance, usually 4 to 5 inches from the closed lower end to permit sufficient downward movement of the piston to fully compress the springs mounting the rear end of the chassis so that, under certain conditions the sprung load of the vehicle may be locked to the rear axle housing to be rigid therewith.

An elastic rubber sleeve 65 encloses and is spaced around the cylinder or barrel 58 from a point below aperture 64 to prevent dirt and foreign matter from being drawn into the cylinder, yet allowing air to be drawn into the cylinder from the space between the sleeve and cylinder and to be expelled into said space.

Upon application of the brakes by application of pressure against the foot pedal 2, the piston 37 of the control valve assembly 5 (FIG. 2) will be moved to the right to thereby effect an increase in pressure in the line 16 that communicates with check valves 17 by progressively restricting the flow of hydraulic fluid through passageways 24, 25, the pump 8 being a constant volume pump.

Each of the check valves 17 comprises a body having an enlarged cylindrical end portion 67 (FIG. 3) at the inlet end provided with head 68 formed with a central threaded opening for threaded engagement with one of the arms of the T-fitting 18. The other arm of the fitting is threadedly secured to the other check valve. Only one check valve will be described as both are alike.

The end portion 69 of the valve body that is opposite to portion 67 is of reduced diameter and is internally formed with a tapered valve seat 70 spaced from and facing the head 68. An annular valve member 71 is yieldably held against seat 70 by a relatively strong helical spring 72, which spring reacts between valve member 71 and head 68, said valve member being spaced from said head. The head 68 and valve member 71 have opposedly projecting coaxial bosses or tubular projections around their central openings around which the ends of spring 72 extend.

The reduced diameter end portion 69 of the check valve terminates in an annular radially inwardly projecting flange 73 that, in turn, has an axially outwardly projecting interiorly threaded tubular extension for securement to one of the hydraulic lines 19 leading to the upper end of one of the hydraulic cylinders 20.

Flange 73 is spaced a substantial distance from the valve seat 70 and is coaxial with the latter. The inner side of the end portion 69 of the body of the check valve is formed with a annular shoulder 74 that axially faces valve member 71 and an annular disc 75 having an annular axially projecting flange 76 on the side facing said valve member 71 may be secured against said axially facing side of said shoulder 74 as by a press-fit of the outer peripheral edge of disc 75 with the interior of the portion 69 adjacent shoulder 74.

Disposed between disc 75 and valve member 71 is a disc valve element 77 formed with a relatively small central opening 78 coaxial with the open relatively large central opening in the annular valve member 71. An annular flange 79 on the disc valve element 77 around its outer periphery projects toward the disc 75 and telescopically extends over the flange 76.

The valve member 71 includes an axially extending cylindrical projection 80 having terminal end edges seated against the side of valve disc 77 that faces valve member 71, and a helical spring 81 reacts between a disc 82 seated in a recess in flange 73 and the valve element 77 for yieldably urging said valve element 77 seated against the projection 80 on valve member 71. Flanges 76, 79 extend around spring 81 and the end of said spring at disc 82 extends around a tubular central projection on said disc.

In operation, when the vehicle is driven over a normal road surface, the slight downward movements of the rear wheel adjacent to the cylinder 20 will unseat valve element 77 and aperture 78 in said element may be adequate to permit passage of the fluid on the return movement without unseating valve 71, but the valve 71 will be unseated under a predetermined increase in the pressure in the chamber in which valve element 77 is positioned.

Thus, it is seen that the cylinders 20 will function as shock absorbers.

Upon application of the brakes by actuation of foot pedal 2, the hydraulic fluid in line 33 will move the piston 37 in tubular extension 35 to the right, as viewed in FIG. 2, thereby moving rod 41 and head 47 therein to the right, thereby restricting the flow of hydraulic fluid through passageway 24 and increasing the pressure in passageway 32 and to line 16 leading to the check valves 17, with the result that the valve elements 77 will be opened and the pistons 60 and rods 61 will positively and uniformly draw the rear end of the sprung portion of the vehicle downwardly. An axially facing shoulder 85 within the tubular extension 35 (FIG. 2) acts as a stop for movement of rod 41 so that the head 47 on said rod will not close the passageway 24, thereby leaving a flow of ample fluid to the power steering unit for operation of the latter in its normal manner.

The rapidity, extend and duration of downward movement of the rear portion of the load on the springs of the vehicle are proportional to the rapidity, degree, and duration of the application of pressure on the foot pedal, but the extent of said downward movement is normally restricted by the maximum collapse or compression of the rear springs, and when this point is reached the body is rigid relative to the rear axle housings and loss of control of the vehicle from lateral back and forth whipping of the rear end upon severe application of the brakes is virtually impossible. It should also be noted that the tipping over a vehicle in which the normally sprung weight is rigid with the rear wheels requires the application of a great deal more lifting force than where the body can be swayed back and forth, which, in many instances, precludes the upsetting of the vehicle by rioters.

The valve 71 will function as a safety valve and will be unseated under any condition of overloading the cylinders and the portion of the check valve to the right of valve member 71 as viewed in FIG. 3.

From the foregoing explanation it is apparent that the stabilizing action of the cylinders 20 upon actuation of the brakes is dependent upon the increase in the presence of the hydraulic fluid in line 16, upon actuation of the brake pedal, and in the present instance the fluid for transmission of the added pressure is in the fluid lines leading to and from the constant volume pump.

A Bowden cable 86, or the equivalent, may extend from a manually graspable element 87 accessible to the driver to a reduced extension 89 of valve member 50 of the control valve assembly 5. Upon manual movement of said element 87 in one direction, the valve member 50 will be in the full line position shown in FIG. 2 but upon movement in the opposite direction the member 50 will block off passage of fluid directly across passageway 28 from line 32 to line 19, and the fluid in line 16 to cylinder 20 will not be in communication with the fluid in passageway 30 with the result that the rear cylinder 20 will merely function as shock absorbers, and the cylinders will not be actuated for moving the rear end of the body or the sprung chassis down with each application of the brakes, so the driver may disconnect, as it were, the depressing action of the cylinders when brakes are frequently applied, as in parking, or in crowded traffic where movement of the vehicle is slow and the braking is frequent.

As is well know, the power steering control valve in the conventional power steering unit 7 is actuated by driver steering effort, admitting hydraulic fluid under heavy pressure to one side or the other of a piston 95 (FIG. 5), irrespective of the type of the power steering unit, thus assisting the driver in manipulating the front wheels 96. When no pressure (generally above one to three pounds) is applied to the steering wheel 90, the oil pressure is equalized in the power steering unit and at opposite sides of the piston 95, and in the present invention there is no imbalance in the pressures of fluid in lines 11, 12 in the control valve 5 when the pressure is equalized at opposite sides of piston 95. However, upon making a right or left turn, or in the application of steering force to the steering wheel above the abovementioned predetermined amount, as occurs in rounding a curve above a certain speed, the balance of pressure in lines 11, 12 is upset, and the pressure in line 11 is increased, due to the closing of the line leading from the power steering unit to one end or the other of the hydraulic cylinder that assists in steering, according to whether the turn made is a right turn or a left turn. As mentioned before, this operation is conventional in power steering valves of the two general types, and is well known in the art.

The back pressure developed in line 11, as above noted, will automatically result in an increase in pressure in line 16 leading to the check valves 17 and cylinders 20, resulting in either automatically stabilizing the sprung load on the wheels against sway in cornering, if the turning pressure on the steering wheel is relatively slight, such as when the vehicle is moving around a well banked curve in the road, or if the turn is sharp and at a relatively high speed the pressure on the upper sides of the pistons 60 in cylinder 20 may be sufficient to result in a full compression of the rear springs and virtually locking the sprung load to the rear axles. The degree of downward pressure on said pistons 60 is directly proportional to the degree of force applied to the steering wheel in making a turn. Thus, the degree of stability obtained is directly proportional to the need for the same.

In normal highway driving at speeds up to say approximately 25 miles per hour, the driver and occupants are not aware of the stabilizing action, other than in the improved roadability of the vehicle at curves. At higher speeds, and at sharp corners, the stability of the vehicle is increased to the extent that the likelihood of overturning of the vehicle and loss of control heretofore of relatively common occurrence is substantially eliminated.

It is apparent from the foregoing explanation that the stabilizing operation upon actuation of the brakes is always present, unless rendered ineffective, and it is automatically stabilized when the vehicle is making a turn that is resisted.

The method is applicable to a vehicle having a load sprung on the front and rear ground wheels, and which vehicle includes the conventional power steering and pump operative in its normal manner in an endless conduit for continuously circulating a hydraulic fluid in one direction in said conduit. By normal manner, is meant one in which a valve in the conduit is operative for movement from a neutral position in which pressure of the fluid in the conduit is balanced at opposite sides of the valve and is increased at one side upon turning the steering wheel to a position to effect and maintain said change of direction during movement of the vehicle around a corner of curve, particularly in those instances where the vehicle is moving at a relatively high rate of speed and where there is a likelihood of loss of control of the vehicle. The steps of the method in such a vehicle comprises initially of effecting a continuous circulation of the hydraulic fluid in such endless conduit, and at the same time effecting a forward movement of the vehicle, and upon making the utrn, automatically transmitting the force of said increased pressure to said load adjacent to said rear wheels in a downward direction and holding said load under the influence of said force uniformly stable at both rear wheels against upward and lateral movement relative to said rear wheels, and the strength of which force is in direct proportion to the turning force manually applied to the steering wheel, and of sufficient maximum force to hold said load rigid with said rear wheels against upward or downward movement. This downward force is automatically and progressively relieved upon return of the steering wheel to normal position upon release of the turning effort applied to the wheel to return the springs to performing their intended function of absorbing road shocks.

The method may go further in transmitting a portion of the hydraulically transmitted braking force to the sprung load adjacent the rear wheels in said downward direction under foot pressure applied to the piston in the master cylinder to cooperate with the force transmitted through fluid in the endless conduit already mentioned, where the brakes are applied during or at the time of turning the steering wheel.

While manually actuatable means 86, 87 has been described for rendering the control valve assembly inoperative for de-pressing the rear end of the chassis upon application of the brakes, in many instances it is preferable that the actuation of the valve member 50 be automatic. The objectional nose-diving and the partial or entire loss of control of a motor-driven vehicle upon application of the brakes are occasioned by the rate of speed of the vehicle at the time the brakes are applied. There are instances in which the driver may have forgotten to "re-set" the control valve unit, after having rendered it inoperative during parking or while in a slowly moving line. Where desired, operation of the valve member 50 may be automatic, according to the rate of movement of the vehicle.

Figure 6:
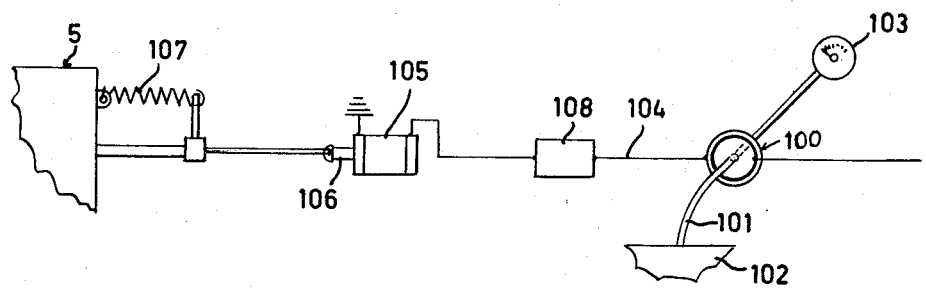
FIG. 6 is a diagrammatic view of an automatic control means in place of a manual control means for rendering part of the system inoperative at slow ground speeds of the vehicle.

FIG. 6 is diagrammatically illustrative of a readily installed control of valve member 50 in which any suitable conventional centrifugal switch 100 is connected with or inserted in the regular speedometer cable 101 that extends between the transmission 102 and the speedometer 103.

Electrical line 104 is connected with the terminals or contacts of the centrifugal switch 100 for closing from an open position when vehicle is moving at a predetermined speed. This may be approximately 25 miles per hour, or the switch may be set for automatically closing at any desired speed within its limits of adjustment, and it will remain closed until the speed drops below said predetermined speed.

Solenoid 105 will be energized when switch 100 is closed. Plunger 106 of the solenoid 105 is connected with the extension 89 of the control valve assembly 5 to position the valve member 52 in the full line position shown in FIG. 2 when the solenoid is energized, and a spring 107 may connect the plunger 106 with the body 6 of the control valve assembly to move the valve member 52 to inoperative position for actuation of the cylinders 20 when the road speed of the vehicle is less than say 25 miles per hour, or when said switch 100 is open. The extension 89 may be extended beyond the valve housing for connecting with plunger 106.

By this arrangement the cylinders 20, while operating at all times as shock absorbers, will not otherwise be actuated or actuatable if the vehicle is moving at a speed less than the speed at which the switch is set to operate.

A conventional delay relay 108 may be inserted in the circuit 104 to prevent instantaneous reaction to closing of switch 100, if desired.

The word "chassis" as used herein refers to the sprung weight, such as all parts supported on the frame, including the motor, power steering unit, master cylinder, etc. whether the frame is of the integral frame type that includes the body or portions thereof, or is of the type in which the body is secured on structural frame members. It does not include the unsprung weight.

The term running gear as used herein refers to the unsprung weight such as the wheels, axles, and brakes.

I claim:

1. In a vehicle having a chassis, a running gear including front and rear ground wheels, a fluid braking system including fluid operable brakes, a fluid pressure system connected with said brakes including a master fluid cylinder for fluid and first fluid conduits connecting said cylinder with said brakes for transmission of fluid from said cylinder to said brakes and brake applying means operatively connected with said cylinder movable under pressure applied thereto by the driver of said vehicle for so applying said brakes, spring means supporting said chassis above said receiving gear:

a. hydraulically retractable means connecting said chassis with said running gear adjacent to each of said rear wheels connected with said fluid pressure system responsive to said transmission of fluid to said brakes upon actuation of said brake applying means for retractable movement for drawing said rear end of said chassis downwardly and collapsing said springs to a degree directly proportional to the degree of pressure applied by said driver to said brake applying means, b. said hydraulically retractable means including a pair of members connected for relative reciprocable movement from a retracted position upon said actuation of said brake applying means to an expanded position under the influence of said spring means upon release of said brake applying means, c. second fluid conduits connecting each of said hydraulically retractable means with said fluid pressure system, and said fluid pressure system including said second conduits being filled with hydraulic fluid all of which is responsive to actuation of said brake applying means for simultaneous transmission thereof.

2. In a vehicle as defined in claim 1;

d. manually actuatable means in said fluid pressure system actuatable for closing said second fluid conduits to transmission of fluid to said hydraulically retractable means when said brake applying means is operative for applying the brakes, and e. check valves in said second conduits respectively including valve members movable from a position restricting relatively free flow of fluid in said second conduits toward said master fluid cylinder upon movement of said running gear toward said chassis for absorbing road shocks when said brake applying means is inoperative, to a position permitting relatively free flow of said fluid from said master cylinder upon movement of said running gear away from said chassis.

3. In a vehicle as defined in claim 2;

f. said check valves including a relief valve member movable under a predetermined amount of pressure in said second conduit in the portion thereof between said check valve and said hydraulically retractable means to relieve excess fluid pressure in said portion and in said hydraulically retractable means.

4. In a vehicle as defined in claim 1;

d. said hydraulically retractable means each comprising a cylinder, a single piston therein having a head closing one end thereof and a piston rod reciprocable through said head in fluid sealing relation thereto, e. means for securing said piston rod to said chassis and means for securing said cylinder to said running gear, f. each of said second conduits being connected with one of said cylinders at a point between said head and said piston.

5. In a vehicle as defined in claim 1;

d. means in said fluid pressure system responsive for movement under the influence of movement of said vehicle at a predetermined road speed automatically actuatable for closing said second fluid conduits to transmission of fluid to said hydraulically retractable means below a predetermined rate of speed of said vehicle, whereby said brake applying means will be operative for actuating said hydraulically retractable means only when the rate of speed of said vehicle is above said predetermined rate.

* * * * *